United States Patent
Lin et al.

(10) Patent No.: US 12,198,693 B2
(45) Date of Patent: Jan. 14, 2025

(54) INFORMATION PROCESSING METHOD, INFORMATION CONTROL CENTER DEVICE, AND COMPUTER-READABLE STORAGE MEDIUM

(71) Applicant: AI Speech Co., Ltd., Jiangsu (CN)

(72) Inventors: Yongkai Lin, Jiangsu (CN); Shuai Fan, Jiangsu (CN); Peng Yang, Jiangsu (CN); Ruiting Xu, Jiangsu (CN)

(73) Assignee: AI Speech Co., Ltd., Jiangsu (CN)

( * ) Notice: Subject to any disclaimer, the term of this patent is extended or adjusted under 35 U.S.C. 154(b) by 282 days.

(21) Appl. No.: 17/758,051

(22) PCT Filed: Nov. 9, 2020

(86) PCT No.: PCT/CN2020/127639
§ 371 (c)(1),
(2) Date: Jun. 27, 2022

(87) PCT Pub. No.: WO2021/135652
PCT Pub. Date: Jul. 8, 2021

(65) Prior Publication Data
US 2023/0032792 A1    Feb. 2, 2023

(30) Foreign Application Priority Data
Dec. 30, 2019 (CN) .......................... 201911396185.1

(51) Int. Cl.
*G10L 15/22* (2006.01)
*G10L 15/18* (2013.01)

(52) U.S. Cl.
CPC .......... *G10L 15/22* (2013.01); *G10L 15/1815* (2013.01); *G10L 15/1822* (2013.01); *G10L 2015/223* (2013.01)

(58) Field of Classification Search
CPC . G10L 15/22; G10L 15/1815; G10L 15/1822; G10L 2015/223; G10L 15/34; G04G 13/02; G04G 13/021; H04L 67/10
See application file for complete search history.

(56) References Cited

U.S. PATENT DOCUMENTS 9,747,280 B1 *   8/2017  Smyros ................. G06F 40/279
10,832,005 B1 * 11/2020  Mohajer ................. G10L 25/87
(Continued)

FOREIGN PATENT DOCUMENTS

| CN | 103440866 A | 12/2013 |
|---|---|---|
| CN | 106020953 A | 10/2016 |

(Continued)

OTHER PUBLICATIONS

First Office Action—Chinese Application No. 201911396185.1, The State Intellectual Property Office of People's Republic of China.
(Continued)

*Primary Examiner* — Abul K Azad
(74) *Attorney, Agent, or Firm* — Sisson & Banyas, Attorneys at Law, LLC; Edwin A. Sisson (57) ABSTRACT

The present invention discloses an information processing method, an information control center device, and a computer-readable storage medium. The method comprises: obtaining semantic parsing information corresponding to a sound signal, the semantic parsing information including a designated time; performing a time prediction on the designated time based on a current time to determine an intended time; and generating a target instruction corresponding to the sound signal based on the intended time. With this method, the information control center device can process complex and diverse sound signals, and the designated time and target intention in a sound signal can be extracted from the semantic parsing information. Because of the time prediction on the semantic parsing information with (Continued)

the designated time, the designated time provided in the sound signal can be processed more accurately, and the voice interaction process is more accurate.

10 Claims, 7 Drawing Sheets

(56) References Cited

U.S. PATENT DOCUMENTS

| | | | | |
|---|---|---|---|---|
| 10,956,680 B1* | 3/2021 | Gupta | ................... | G06F 40/205 |
| 2009/0048832 A1 | 2/2009 | Terao | | |
| 2010/0318398 A1* | 12/2010 | Brun | ................... | G06Q 10/109 |
| | | | | 705/7.18 |
| 2018/0039477 A1* | 2/2018 | Sung | ................... | G06F 3/167 |
| 2020/0401509 A1 | 12/2020 | Hsu | | |

FOREIGN PATENT DOCUMENTS

| | | |
|---|---|---|
| CN | 106941619 A | 7/2017 |
| CN | 107465599 A | 12/2017 |
| CN | 111192579 A | 5/2020 |
| JP | S63151190 A | 6/1988 |
| JP | 2000194368 A | 7/2000 |
| JP | 2006292633 A | 10/2006 |
| WO | 2014176750 A1 | 11/2014 |
| WO | 2019167373 | 9/2019 |

OTHER PUBLICATIONS

JIPO, First Notice of Reasons for Refusal fro JP2022-540600, Jul. 24, 2023, Original and English Translation whole document.

JIPO, Second Notice of Reasons for Refusal fro JP2022-540600, Dec. 26, 2023, Original and English Translation whole document.

Supplementary European Search Report for 20909397 PCT/CN2020127639 May 12, 2023, whole document.

* cited by examiner

INFORMATION PROCESSING METHOD, INFORMATION CONTROL CENTER DEVICE, AND COMPUTER-READABLE STORAGE MEDIUM

PRIORITIES AND CROSS REFERENCES

This application claims priority from International Application No. PCT/CN2020/127639 filed on 9 Nov. 2020 and Chinese Application No. 201911396185.1 filed on 30 Dec. 2019 the teachings of each of which are incorporated by reference herein in their entirety.

TECHNICAL FIELD

The present invention relates to the technical field of voice processing, and in particular, to an information processing method, an information control center device and a computer-readable storage medium.

BACKGROUND

Different from a traditional alarm clock that can only manually set alarm and time, a smart alarm clock can realize the setting of an alarm clock task through voice interaction. However, at present, due to the limitation of the client's own data processing capability, it is difficult for the client to understand real intention of a user to set the time. When the user sets time through voice interaction, it is required to accurately provide the date and instant of the time before the client can set the corresponding tasks, which adversely affect the user experience.

SUMMARY OF THE INVENTION

Embodiments of the present invention provide an information processing method, an information control center device, and a computer-readable storage medium, which can perform a time prediction on time from a sound signal to determine an intended time that meets demand.

An aspect of the present invention provides an information processing method, which is applied to an information control center device. The method includes: obtaining semantic parsing information corresponding to a sound signal, which includes a designated time; performing a time prediction on the designated time based on a current time to determine an intended time; and generating a target instruction corresponding to the sound signal based on the intended time.

In an embodiment, the performing a time prediction on the designated time based on a current time to determine an intended time includes: determining whether the designated time includes a designated instant to obtain a first determination result; determining whether the designated time includes a designated date to obtain a second determination result, when the first determination result is that the designated time includes the designated instant; determining whether the designated date is later than a current date to obtain a third determination result, when the second determination result is that the designated time includes the designated date; and determining the designated instant and the designated date as the intended time, when the third determination result is that the designated date is later than the current date.

In an embodiment, the method further includes: determining the current date as a provisional date, when the second determination result is that the designated time does not include the designated date; determining the provisional date and the designated instant as a provisional time; determining whether the provisional time is not earlier than the current time to obtain a fourth determination result; and determining the provisional time as the intended time, when the fourth determination result is that the provisional time is not earlier than the current time.

In an embodiment, the method further includes: correcting the provisional time based on a principle of time proximity to obtain a corrected time, when the fourth determination result is that the provisional time is earlier than a current instant; and determining the corrected time as the intended time.

In an embodiment, the principle of time proximity comprises at least one of: a first principle for correcting a provisional instant, a second principle for correcting the provisional date, and a third principle for correcting the provisional date.

In an embodiment, the method further includes: determining whether the designated instant includes a designated period to obtain a fifth determination result; and performing a type conversion on the designated instant based on an instant conversion rule to obtain a converted instant, when the fifth determination result is that the designated instant includes the designated period, wherein the converted instant is used to determine the provisional time, the converted instant does not include the designated period, and the converted instant and the designated instant are used to represent a same time.

In an embodiment, wherein the instant conversion rule includes at least one of: a first conversion rule for converting an instant type, a second conversion rule for correcting a slip of tongue, and a third conversion rule for processing an instant critical point.

In an embodiment, before determining whether the designated time includes a designated instant, further comprising: obtaining the designated time based on the semantic parsing information; verifying whether the designated time complies with a temporal regularity to obtain a verification result; and determining whether the designated time includes the designated instant, when the verification result is that the designated time complies with the temporal regularity.

Another aspect of the present invention provides an information control center device including: an obtaining module for obtaining semantic parsing information corresponding to a sound signal, the semantic parsing information including a designated time; a predicting module for performing a time prediction on the designated time based on a current time to determine an intended time; and a generating module for generating a target instruction corresponding to the sound signal based on the intended time.

In an embodiment, the predicting module includes: a first determining sub-module for determining whether the designated time includes a designated instant to obtain a first determination result; a second determining sub-module for determining whether the designated time includes a designated date to obtain a second determination result, when the first determination result is that the designated time includes the designated instant; a third determining sub-module for determining whether the designated date is later than a current date to obtain a third determination result, when the second determination result is that the designated time includes the designated date; and a determining sub-module for determining the designated instant and the designated date as the intended time, when the third determination result is that the designated date is later than the current date.

In an embodiment, the determining sub-module is further used to determine the current date as a provisional date, when the second determination result is that the designated time does not include the designated date; the determining sub-module is further used to determine the provisional date and the designated instant as a provisional time; the predicting module further includes a fourth determining sub-module for determining whether the provisional time is not earlier than the current time to obtain a fourth determination result; the determining sub-module is further used to determine the provisional time as the intended time, when the fourth determination result is that the provisional time is not earlier than the current instant.

In an embodiment, the predicting module further includes: a correcting sub-module for correcting the provisional time based on a principle of time proximity to obtain a corrected time, when the fourth determination result is that the provisional time is earlier than a current instant; the determining sub-module is further used to determine the corrected time as the intended time.

In an embodiment, the predicting module further includes: a fifth determining sub-module for determining whether the designated instant includes a designated period to obtain a fifth determination result; a converting sub-module for performing a type conversion on the designated instant based on an instant conversion rule to obtain a converted instant, when the fifth determination result is that the designated instant includes the designated period; the converted instant is used to determine the provisional time, the converted instant does not include the designated period, and the converted instant and the designated instant represent a same time.

In an embodiment of the present invention, the obtaining module is further used to obtain the designated time based on the semantic parsing information. The device further includes a verifying module for verifying whether the designated time complies with a temporal regularity to obtain a verification result. When the verification result is that the designated time complies with the temporal regularity, it is determined whether the designated time includes the designated instant.

Another aspect of the present invention provides a computer-readable storage medium comprising a set of computer-executable instructions for performing the information processing method of any one of the above when the instructions are executed.

The information control center device is applied with the information processing method provided by the embodiments of the present invention, which can process complex and diverse sound signals, and the designated time in a sound signal can be extracted from the semantic parsing information. Because of the time prediction on the semantic parsing information with the designated time, the designated time provided in the sound signal can be processed more accurately, and the voice interaction process is more accurate.

BRIEF DESCRIPTION OF THE DRAWINGS

The above and other objects, features and advantages can be better understood by reading the following exemplary embodiments of the present invention with reference to the drawings. The drawings illustrate, by way of example and not limitation, several embodiments of the present invention, wherein like or corresponding reference signs refer to like or corresponding parts.

DETAILED DESCRIPTION

In order to make the purposes, features and advantages of the present invention more obvious and easier to understand, the technical solutions of the embodiments of the present invention will be clearly and completely described below with reference to the drawings of the embodiments of the present invention. Obviously, the described are merely some but not all of the embodiments of the present invention. Based on the embodiments of the present invention, all other embodiments obtained by ordinary skilled in the art without inventive efforts shall fall within the scope of the present invention.

Figure 1:
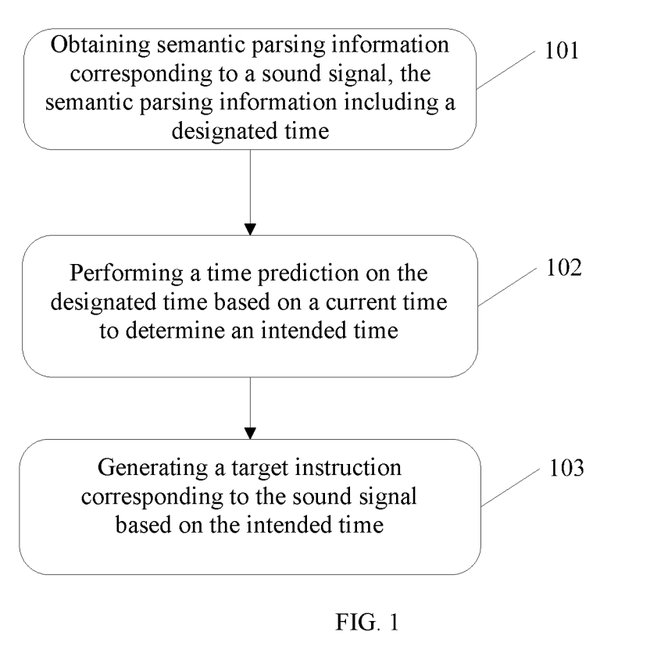
FIG. 1 is a schematic diagram of a flowchart of implementing an information processing method according to an embodiment of the present invention.

FIG. 1 is a schematic diagram of a flowchart of an information processing method according to an embodiment of the present invention.

Referring to FIG. 1, an information processing method according to an embodiment of the present invention is applied to an information control center device. The information control center device can be, for example, a cloud server. The method comprises: Step 101, obtaining semantic parsing information corresponding to a sound signal, the semantic parsing information including a designated time; Step 102, performing a time prediction on the designated time based on a current time to determine an intended time; and Step 103, generating a target instruction corresponding to the sound signal based on the intended time.

The information processing method provided in this embodiment is applied to an information control center device and can process complex and diverse sound signals. The sound signals undergo voice recognition and semantic parsing to obtain semantic parsing information including a designated time and a designated task. The designated task is a corresponding target intention in a sound signal. The designated time is an execution time corresponding to the execution of the target intention in the sound signal. When the designated time is inaccurate, the intended time corresponding to the designated task can be accurately determined by performing a prediction on the designated time based on the current time. The information control center device sets a target instruction according to the intended time, and instructs a client to perform the user's designated task at the intended time, so as to realize a more accurate result corresponding to the voice interaction.

The information control center device may be a device with data processing capability. In this embodiment, the information control center device may be a cloud server. The cloud server performs voice processing on the sound signal, which can greatly reduce the hardware requirements of the client, and does not require complex semantic rule customization on the client. When the cloud server is semantically upgraded, the client does not need to be updated. In this embodiment, the client is a terminal that performs signal transmission with the information control center device (e.g., the cloud server), and the client has a corresponding function of executing the target instruction. That is, the target instruction can be set according to the function of the client, and the client may be an alarm clock.

This method comprises obtaining semantic parsing information corresponding to a sound signal, and the semantic parsing information includes a designated time. The sound signal can be collected by an audio collection device. In this embodiment, the audio collection device for collecting the sound signal is selected as a microphone array composed of a certain number of microphones, and is installed on the client. The semantic parsing information is the information obtained after the sound signal is processed by voice recognition and semantic parsing. The microphone array collects sound signals through signal processing algorithms, identifies the direction of the sound source, and can also remove background sounds to a certain extent to improve the accuracy of subsequent voice recognition. The sound signal is transmitted to the information control center device using a network. The information control center device performs voice recognition on the sound signal through the ASR voice recognition technology, and converts the sound signal into text information corresponding to the voice. In this method, the ASR voice recognition technology is trained based on the acoustic model and the language model in the home environment, which can be better adapted to the home scenario, and can accurately recognize the sound signal and obtain accurate text information even in the noisy scenario. The text information is semantically parsed by the semantic parsing module, and the semantic parsing module parses the text information into semantic parsing information. For example, in one case, the text message "remind me to buy a train ticket at seven o'clock" will be parsed into the following structure of semantic parsing information {time=07:00, reminder event=buy a train ticket, task object=reminder}; in another case, the text information "alarm clock at five o'clock" will be parsed into the following structure {time=05:00, task object=alarm clock}.

The method may further include that the information control center device performs a time prediction on the designated time based on a current time to determine an intended time. The semantic parsing module sends the semantic parsing information to a dialog management system. Based on the designated time, the dialog management system performs a time prediction from the semantic parsing information to obtain the intended time. The semantic parsing information is not directly returned to the client, which can avoid the client's needs to make multiple requests to the information control center device, and improve the performance and response time of the client.

The intended time used to generate a target instruction is required to include date information and instant information. Since the instant information exists in a 12-hour format and a 24-hour format, the instant information also includes time period information and hour information. For example, a time information that satisfies the intended time accuracy requirement contains {date=20190305, period=pm, hour=5:00}.

The designated time parsed by the sound signal usually only includes hour information, which does not fully meet the above requirements. Therefore, it is necessary to perform a prediction on the designated time based on the current time in order to obtain time information that matches with the intended time. For example, when the designated time obtained from the semantic parsing information is {hour=5:00}, the designated time is predicted based on the current time. The current time is {date=20190305, period=pm, hour=4:00}, then the obtained intended time is {date=20190305, period=pm, hour=17:00}. That is, a future time that is closest to the current time and can meet the description of the designated time is selected as the intended time.

The method further includes that the information control center device generates a target instruction corresponding to the sound signal based on the intended time. According to the designated task and the intended time, the target instruction corresponding to the sound signal can be generated to instruct the execution of the designated task in the sound signal. For example, when the sound signal is "Remind me to buy a train ticket at 7:00", in the semantic parsing information obtained by the information control center device according to the semantic parsing, the designated time is "7:00", the task object is "Reminder", and the reminder event is "Buy a train ticket". A time prediction is performed on the designated time as "7:00", and the current time is determined as "December 26, 2019, 8:00" based on the principle of time proximity, then the intended time is determined as "December 27, 2019, 7:00". Then the target instruction is generated, which corresponds to the intended time of "December 27, 2019, 7:00", the task object of "Reminder", and the reminder event of "Buy a train ticket", and is sent to the client, so that the client will conduct a reminding of buying a train ticket through voice broadcast at 7:00 on December 27th, 2019. It should be noted that it is not limited to the client for receiving the target instruction. When the designated task of the target instruction is to modify the information control center device, the information control center device is the receiver of the target instruction. When the designated task of the target instruction is to control a third-party terminal, the third-party terminal may also be the receiver of the target instruction.

The method may further include that the information control center device generates the task instruction according to the intended time and the designated task, performs voice synthesis processing according to the intended time to obtain an audio signal corresponding to the designated task, determines the task instruction and the audio signal as the target instruction, sends the target instruction to the client, so that the client executes the task instruction and broadcasts the audio signal.

After obtaining the intended time, the dialog management module processes the intended time and the designated task, thereby obtaining the target instruction including the audio signal and the task instruction, and then the target instruction is sent to the client. The client executes the task instruction and broadcasts the audio signal through parsing the target instruction to form voice interaction with users. Specifically, after receiving the intended time, the dialog management system will return different audio reply information through voice synthesis technology according to the dialog state. For example, when the dialog management system receives the following intended time of {date=20190305, period=pm, hour=05:00, task object=alarm clock}, it will send the task instruction of setting the alarm clock to the client, and meanwhile generate a text reply of "The alarm clock at 05:00 has been set successfully". The text reply is sent to the client by synthesizing it into audio signal through voice synthesis technology. Since the alarm clock has been successfully set, the dialog management system will also include the state of the end of the dialog in the returned data.

Figure 2:
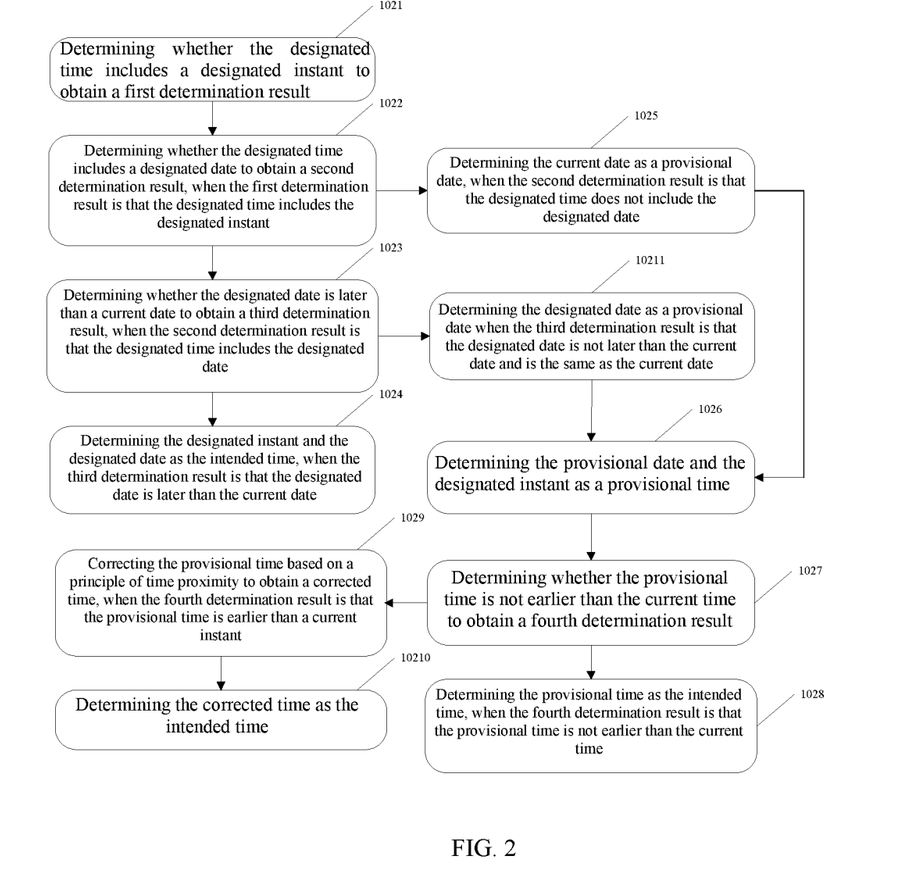
FIG. 2 is a schematic flowchart of a time prediction of an information processing method according to an embodiment of the present invention.

FIG. 2 is a schematic flowchart of a time prediction of an information processing method according to an embodiment of the present invention. The method is applied to the information control center device.

Referring to FIG. 2 showing an embodiment of the present invention, performing a time prediction in Step 102 on the designated time based on a current time to determine an intended time includes: Step 1021, determining whether the designated time includes a designated instant to obtain a first determination result; Step 1022, determining whether the designated time includes a designated date to obtain a second determination result, when the first determination result is that the designated time includes the designated instant; Step 1023, determining whether the designated date is later than a current date to obtain a third determination result, when the second determination result is that the designated time includes the designated date; and Step 1024, determining the designated instant and the designated date as the intended time, when the third determination result is that the designated date is later than the current date.

The designated time obtained through semantic parsing may involve the following two cases: one is that the designated time exists in the parsing information, and the other is that the designated time does not exist in the parsing information. When the designated time does not exist in the parsing information, the device cannot generate the target instruction with the intended time and the designated task, and multiple rounds of dialog interaction need to be performed through voice synthesis technology to obtain the designated time. Specifically, when the designated time does not exist in the parsing information, the information control center device may generate a query instruction and send it to the client. The query instruction is generated through the voice synthesis technology and broadcasted by the client to query the designated time. For example, "How long would you like to be reminded?" Then the sound signal is collected again, and the sound signal is analyzed through voice recognition and semantics analysis to obtain a supplementary time in the sound signal. The supplementary time is used to supplement the designated time. The supplementary time can be determined as the designated time.

For example, when the sound signal is "set the alarm clock", the semantic parsing information is {task object=alarm clock, operation=set}, and there is not a designated time. The dialog management system will generate a text reply "Okay, what time do you want to set the alarm clock?" The text will be converted into audio through the voice synthesis technology and sent to the client, and the information that the dialog state has not ended will also be returned to the client. After playing this audio, the client will collect the user's voice information through the microphone array to determine the designated time of the alarm clock.

Further, when the designated time exists in the parsing information, the designated time may include a designated date and a designated instant. When the designated instant does not exist in the semantic parsing information, the device cannot determine the designated time to execute the designated task. In order to distinguish the above situations, it is necessary to determine whether the designated time includes the designated instant. When the first determination result is that the designated instant does not exist in the semantic parsing information, the device needs to perform multiple rounds of dialog interaction through the voice synthesis technology to obtain the designated time including the designated instant.

When the first determination result is that the designated instant exists in the semantic parsing information, it is further determined whether the designated time includes the designated date to obtain a second determination result. One case is that the second determination result is that the designated time includes the designated date, and the other case is that the designated time does not include the designated date. When it is determined that the designated time includes the designated date, it is required to determine whether the designated date is later than a current date to obtain a third determination result. When the third determination result is that the designated date is later than the current date, the designated instant and the designated date are determined as the intended time.

When the third determination is that the designated date is not later than the current date, and the designated date is earlier than the current date, the designated time is earlier than the current date, and it is impossible for the device to instruct the execution of the designated task in a past time, so it can be determined that the semantic parsing information is invalid, or a voice is generated through the voice synthesis technology and multiple rounds of dialog interaction are performed to obtain the designated time again. When the third determination result is that the designated date is not later than the current date, and the designated date and the current date are the same day, it is necessary to conduct a further comparison for the designated instant for inference of time. As shown in Step 10211, when the third determination result is that the designated date is not later than the current date and is the same as the current date, the designated date is determined as a provisional date.

In the embodiment of the present invention, the method further includes: Step 1025, determining the current date as a provisional date, when the second determination result is that the designated time does not include the designated date; Step 1026, determining the provisional date and the designated instant as a provisional time; Step 1027, determining whether the provisional time is not earlier than the current time to obtain a fourth determination result; and Step 1028, determining the provisional time as the intended time, when the fourth determination result is that the provisional time is not earlier than the current time.

After the current date is determined as the designated date, the designated date now is the same as the designated period and the current date determined according to the above-mentioned third determination result. In this case, the designated date is the same, that is, the designated period are the same day as the current date. The same method can be used for comparison and determination as follows. That is, when the designated period and the current date are the same day, the current date is determined as the provisional date, and the provisional date and the designated instant are determined as the provisional time, and it is determined whether the provisional time is not earlier than the current time to obtain a fourth determination result. The intended time is determined according to the fourth determination result. When the fourth determination result is that the provisional time is not earlier than the current time, that is, the device can correspond to the target instruction of the provisional time, which is used to instruct the execution of the designated task at the provisional time, and the provisional time can be determined as the intended time. In a special case that the provisional time is the same as the current time, the target instruction can also be generated and the execution of the designated task at the intended time can be instructed, that is, the intended time is the same as the current time.

In the embodiment of the present invention, the method further includes: Step 1029, when the fourth determination result is that the provisional time is earlier than a current instant, correcting the provisional time based on a principle of time proximity to obtain a corrected time, and Step 10210, determining the corrected time as the intended time.

When the fourth determination result is that the provisional time is earlier than the current instant, if the provisional time is still determined as the intended time, the intended time will be earlier than the current time, which does not conform to the temporal regularity, and thus the device cannot instruct the client to instruct the execution of the designated task at the intended time. Therefore, the device needs to correct the provisional time so that the corrected time is not earlier than the current time, and thus the device can instruct the client to execute the designated task at the intended time. The principle of time proximity is used to determine the intended time as the future time that is closest to the current time and meets the designated time description.

Figure 3:
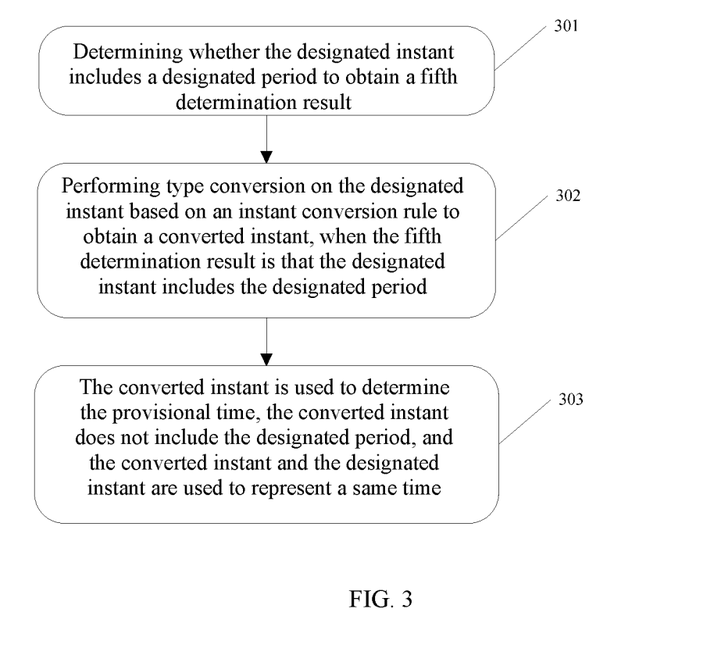
FIG. 3 is a schematic flowchart of an instant conversion of an information processing method according to an embodiment of the present invention.

FIG. 3 is a schematic flowchart of an instant conversion of an information processing method according to an embodiment of the present invention. The method is applied to the information control center device.

Referring to FIG. 3, in the embodiment of the present invention, the method further includes: Step 301, determining whether the designated instant includes a designated period to obtain a fifth determination result; Step 302, when the fifth determination result is that the designated instant includes the designated period, a type conversion is performed on the designated instant based on an instant conversion rule to obtain a converted instant; and Step 303, the converted instant is used to determine the provisional time, the converted instant does not include the designated period, and the converted instant and the designated instant are used to represent a same time.

Since the designated instant obtained from the sound signal has two types: 24-hour format and 12-hour format, and different people understand the time period in different ways. For example, for 0:00 in the evening, some people may regard it as 0:00 of the next day, while some people may regard it as 24:00. For 12:30, some people may regard it as 00:30. In order to facilitate the comparison of provisional time, it is necessary to convert the designated instant to 24-hour format. Similarly, the obtained current instant is also in 24-hour format. This step may be performed at any proceeding step where it is determined whether the designated instant is not earlier than the current instant. Further, the current instant may be the current instant collected by the information control center device from the client, or may be the time zone standard time collected by the information control center device from the network.

Specifically, a time period and an hour are usually included in the expression of the 12-hour format, such as "7:00 am", wherein the designated period refers to words such as "am", "pm" and the like used for time period representation. After the designated instant is obtained, it is determined whether the designated instant includes the designated period. If the designated period is included, it is considered that the designated instant is in the 12-hour format, and the designated instant needs to be converted to obtain the designated instant expressed in the 24-hour format.

The conversion rules may include a first conversion rule for converting the designated instant in the 24-hour format, a second conversion rule for correcting a slip of tongue, and a third conversion rule for processing a date critical point. In order to facilitate the comparison, after the 24-hour format conversion, the period information is still retained, and the period information is adjusted according to the hour information.

Wherein, the first conversion rule for converting the designated instant in the 24-hour format may be:

1. If the designated hour is between 1:00 and 12:00, and the designated period is noon, afternoon or evening and their synonyms, 12 hours are added to the designated hour to obtain the 24-hour converted instant. For example, "7:00 pm" is converted to "19:00 pm".

2. If the designated hour is between 1:00 and the sunrise time (such as 6:00), and the designated period is daytime or its synonym, 12 hours are added to the designated hour to obtain the 24-hour converted instant. The sunrise time can be dynamically adjusted according to different regions. For example, "3:00 am" is converted to "15:00 pm".

3. If the designated hour is between sunset time and 12:00, and the designated period is evening and its synonym, it is required to add 12 hours to the designated hour to obtain the 24-hour converted instant. The sunset time can be dynamically adjusted according to different regions. For example, "10:00 pm" is converted to "22:00 pm".

The second conversion rule for correcting a slip of tongue can be:

1. If the designated hour is between 0:00 and sunrise, and the designated period is evening or its synonym, the designated period is reset to early morning, the designated hour is determined as the converted hour, and an exception flag is set. The following is re-determination according to the principle of time proximity. For example, "1:00 pm" is converted to "1:00 am, exception".

2. If the designated hour is greater than 12:00, and the designated period is morning, forenoon or early morning and its synonyms, the designated period needs to be reset. The designated hour is determined as the converted hour, and an exception flag is set to avoid the impact of the slip of tongue or misidentification. For example, "15:00 am" is converted to "15:00 pm, exception".

The third conversion rule for processing the instant critical point can be:

1. If the designated hour is equal to 24:00, it is required to set the designated hour to 0:00, reset the designated period to early morning, and set an exception flag. For example, "24:00" is converted to "0:00 am, exception".

2. If the designated hour is equal to 12:00, and the designated period is evening, before dawn, or its synonyms, it is required to set the hour to 0:00, reset the designated period to early morning, and set an exception flag. For example, "12:00 pm" is converted to "00:00 am, exception".

In the embodiment, the principle of time proximity comprises at least one of: a first principle for correcting a provisional instant, a second principle for correcting the provisional date, and a third principle for correcting the provisional date. The provisional time includes a provisional instant, a provisional date and a provisional hour. The corrected time obtained by correcting the provisional time also includes three parts: a corrected instant, a corrected date and a corrected hour.

The first rule for correcting the provisional instant can be:

1. When the provisional hour does not include the provisional period, and the provisional hour is less than 12:00, 12 hours are added to the provisional hour to obtain a preset time. It is determined whether the preset time is not earlier than the current time. If the preset time is not earlier than the current time, the preset time is determined as the corrected time. If the preset time is earlier than the current time, the correction of the provisional time is canceled.

The second rule for correcting the provisional date can be:

1. When the provisional time has an exception flag and the provisional hour is less than or equal to 6:00, the next day of the current date is determined as the corrected date.

2. When the provisional hour does not include the provisional period, and the provisional hour is less than 12:00, the next day of the current date is determined as the corrected date.

3. When the provisional hour is between 12:00 and 24:00, and the corresponding sound signal does not include the designated date, the next day of the current date is determined as the corrected date.

4. When both the provisional period and the provisional hour are clear, and the corresponding sound signal does not include the designated date, the next day of the current date is determined as the corrected date.

5. When the provisional date is later than the current date and has an exception flag, the next day of the current date is determined as the corrected date.

The third rule for correcting the provisional time can be:

1. When the provisional hour is 12:00 and the provisional time is earlier than the current time, the provisional hour is corrected to 0:00, 0:00 is determined as the corrected hour, and the next day of the current date is determined as the corrected date.

When the provisional hour is already in 24-hour format, if the provisional time is still less than the current time, it indicates that the provisional date should be further corrected. For example, when the current time is "7:00 pm", the collected sound signal is "alarm clock at 5:00 pm". Even if the time "5:00 pm" is converted to "17:00" by conversion, it is still necessary to add one day on the provisional date according to the principle of time proximity.

Figure 4:
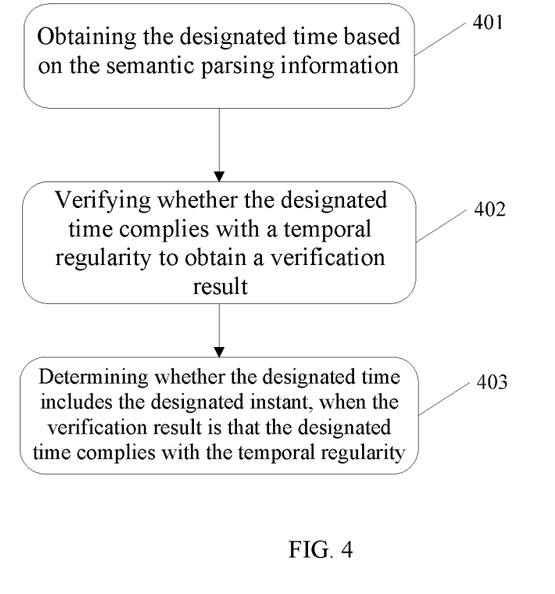
FIG. 4 is a schematic flowchart of a temporal regularity verification of an information processing method according to an embodiment of the present invention.

FIG. 4 is a schematic flowchart of a temporal regularity verification of an information processing method according to an embodiment of the present invention.

Referring to FIG. 4, in this embodiment, before determining whether the designated time includes a designated instant, the method further comprises: Step 401, obtaining the designated time based on the semantic parsing information; Step 402, verifying whether the designated time complies with a temporal regularity to obtain a verification result; and Step 403, when the verification result is that the designated time complies with the temporal regularity, determining whether the designated time includes the designated instant.

In order to give prompts for the unreasonable time, for example, "the alarm clock at 46 o'clock on February 35th" contains a designated date and a designated time that do not exist. Before verifying whether the designated time includes the designated instant, the method further includes: verifying whether the designated time complies with the temporal regularity. It is verified whether the format content of the designated time is reasonable, and when it is determined that the format content of the designated time is reasonable, it is determined whether the designated time includes the designated instant. When the designated date and/or the designated instant does not exist at the designated time, it is determined that the format content of the designated time is reasonable. When it is determined that the format content of the designated time is unreasonable, the audio signal is synthesized through the dialog management system, and a query is performed through the client to obtain a reasonable designated time.

Further, when the client is an alarm clock, according to the function of the alarm clock, the designated task included in the semantic parsing information is used to generate the target instruction, and the type of the designated task includes at least one of: a first second type used to characterize the alarm task, a second type used to characterize the reminder task, the third type used to characterize the memo task, and the fourth type used to characterize the timing task. According to the function of the alarm clock, the designated task includes but are not limited to the above four types, and may also be a fifth type for characterizing deletion, etc., which will not be described in detail below.

Several specific scenarios are provided below for description.

When the sound signal "set the alarm clock at five o'clock" is collected, the information control center device performs a time prediction. If the current time is after 5:00 pm, the target instruction corresponding to the alarm clock at 5:00 am of the next day will be generated. If the current time is before 5:00 pm, the target instruction corresponding to the alarm clock at 5:00 pm on the same day will be generated.

For the first type of task used to characterize the alarm task, in order to further facilitate the user to set multiple tasks, the information control center device determines through semantic parsing whether the designated task is a common single task or a periodic task. A task may refer to an alarm clock. A periodic task can be to repeat the ringing according to the week. For example, when the user says "wake me up at 8:00 am every Monday to Wednesday", the device will generate a repeating periodic alarm setting command {TIME=08:00, REPEAT=W1|W2|W3, object=alarm clock}. Another periodic task can be a repeating response based on the date. For example, when the user says "wake me up at 8:00 am every morning from August 1st to the 10th", the device will generate the corresponding alarm clock setting instruction {TIME=08:00, REPEAT=20190801<20190810, object=alarm clock}.

For the third type of task used to characterize the memo task, after the user says "set a memo", the device will prompt the user "please tell me the content of the memo", and then the user can record the content of the memo on the device or the client.

For the fourth type of task used to characterize the timing task, for example, when the designated task is "set the New Year's Eve time with countdown", the sound signal is collected as "countdown to 0:00", or "set countdown to the New Year", it is possible to generate a task instruction corresponding to middle night of New Year's Eve or the New Year.

The reminder task and the alarm clock task are distinguished according to whether the semantic parsing information contains a reminder event or an obvious reminder keyword. For example, the semantic parsing result of "wake me up at five o'clock" is {time=05:00, object=alarm clock}, and the semantic parsing result of "remind me for a meeting at five o'clock" is {time=05:00, object=schedule, event=meeting}. By distinguishing the parsing objects, the information control center device can simultaneously understand the semantic slots involved in the four time-related functions of alarm clock, reminder, memo, and countdown, and return different dialog states and reply texts according to the dialog state and strategy.

For the set alarm clocks and reminders, especially the periodic alarm clocks, users need to be able to delete specific alarm clocks in some scenarios. Such operations can also be performed by voice, such as "delete the alarm clock", "delete the reminder", "delete the memo", and "cancel the countdown", etc. The delete operation can support conditional deletion of specific alarm clocks. If there are 3 alarm clocks for tomorrow and the day after tomorrow, the user may delete them through the following statement. Voice input "delete tomorrow's alarm clock" corresponds to semantics {operation=delete, date=20190817}. Or "delete the alarm clock for tomorrow morning" corresponds to the semantics {operation=delete, date=20190817, time=06:00<12:00}. Or "delete the alarm clock between 8:00 and 10:00 tomorrow morning" corresponds to the semantics {operation=delete, date=20190817, time=08:00<10:00}. In order to distinguish the alarm clock or other tasks conveniently, when setting the task, the task is named and stored with a specific ID.

When the device receives these sounds, it queries the alarm clock records recorded in the cloud, and returns a target instruction with the alarm clock ID to the device, and the alarm clock can be deleted by the client. This effectively avoids the need for the client to query, filter, and delete the alarm clock according to the user's statement.

Figure 5:
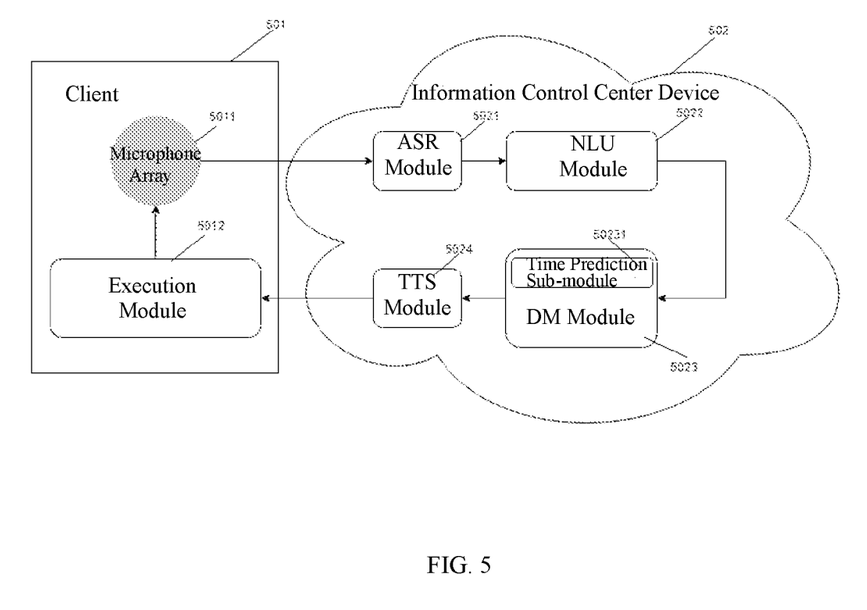
FIG. 5 is a schematic diagram of a scenario where an information processing method according to an embodiment of the present invention is applied.
Figure 6:
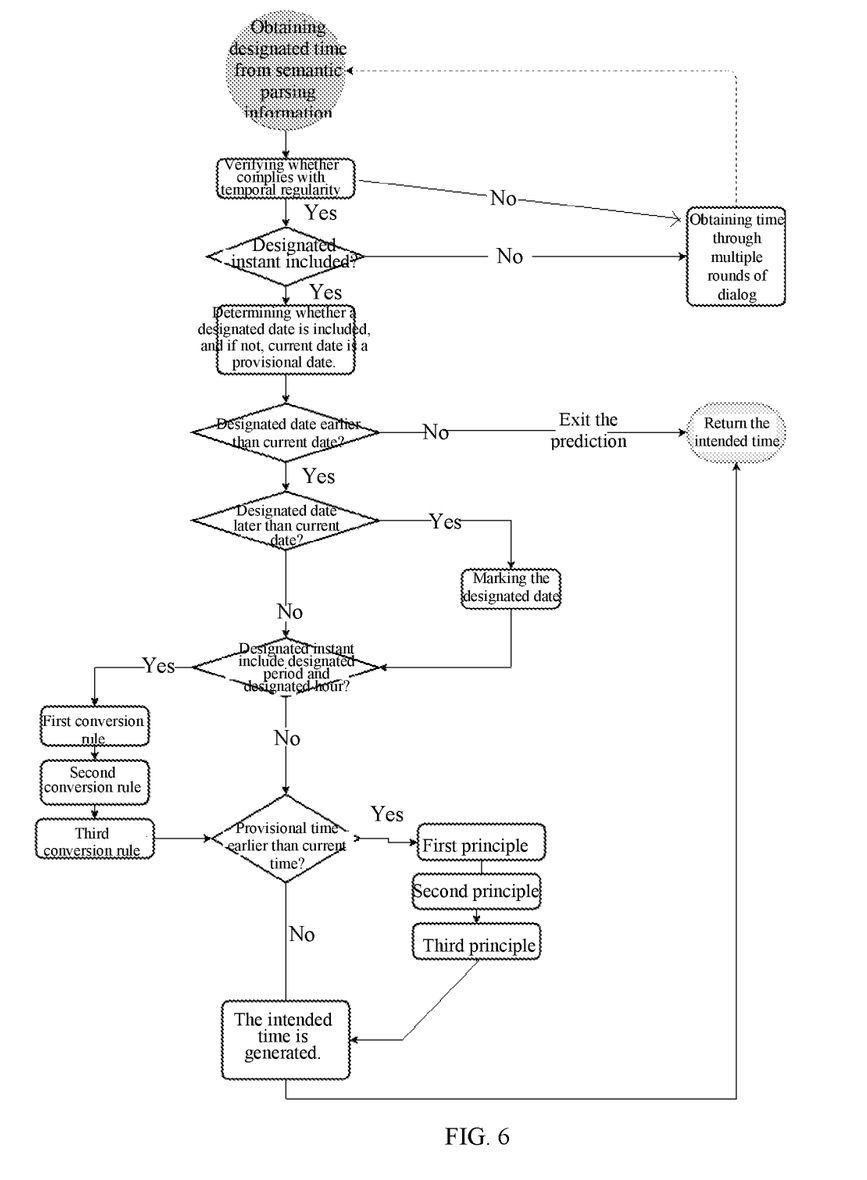
FIG. 6 is a schematic flowchart of a time prediction in a scenario where an information processing method is applied according to an embodiment of the present invention.

FIG. 5 is a schematic diagram of a scenario where an information processing method is applied according to an embodiment of the present invention; FIG. 6 is a schematic flowchart of a time prediction in a scenario where an information processing method is applied according to an embodiment of the present invention.

Referring to FIG. 5 and FIG. 6, in order to facilitate understanding of the embodiment, an overall process scenario is used for explanation.

This scenario includes a client 501 and an information control center device 502, and the client 501 and the information control center device 502 are connected in communication. The client 501 is provided with a microphone array 5011 and an execution module 5012 for executing designated tasks. The information control center device 502 includes an Automatic Speech Recognition (ASR) module 5021, a Natural Language Understanding (NLU) module 5022, a Dialog Management (DM) module 5023, and a Text To Speech (TTS) module 5024. The NLP module is used for semantic parsing. The DM module also includes a time prediction sub-module 50231.

The client collects sound signals through the microphone array and sends the sound signals to the information control center device. The information control center device performs voice recognition on the sound signal through the ASR module to obtain text information, and then performs semantic parsing on the text information through the NLU module to obtain the semantic parsing information corresponding to the sound signal. The semantic parsing information is predicted through the time prediction sub-module.

First, the designated time is obtained from the semantic parsing information, which includes the designated date and the designated instant. Then, it is verified whether the designated date and the designated instant comply with the temporal regularity. If the designated date and the designated instant do not comply with the temporal regularity, the DM module conducts multiple rounds of dialog to further obtain the designated time that complies with the temporal regularity. If the designated date and the designated instant comply with the temporal regularity, it is determined whether the semantic parsing information includes the designated instant. When it is determined that the semantic parsing information does not include the designated instant, the DM module conducts multiple rounds of dialog to further obtain the designated instant. When it is determined that the semantic parsing information includes the designated instant, it is determined whether the semantic parsing information includes the designated date, and when it is determined that the designated date is not included, the provisional date is set as the current date. When the designated date is included, it is determined whether the designated date is earlier than the current date, and when it is determined that the designated date is earlier than the current date, the time prediction ends, the result is returned to the client, and an audio signal is generated through the DM module for voice broadcast. When it is determined that the designated date is not earlier than the current date, it is determined whether the designated date is later than the current date, and when it is determined that the designated date is later than the current date, the designated date is marked to indicate that the date belongs to the future date. When it is determined that the designated date is not later than the current date, no mark is made. Then, it is determined whether the designated instant includes the designated period and the designated hour. When it is determined that the designated instant includes the designated period and the designated hour, the designated instant is converted to obtain the converted instant. The designated date and converted time are determined as the provisional time. When it is determined that the designated instant does not include the designated period, the designated date and designated instant are determined as the provisional time. It is determined whether the provisional time is earlier than the current time. When it is determined that the provisional time is earlier than the current time, the provisional date is corrected based on the principle of time proximity to obtain the intended time. Then, the intended period is generated based on the intended instant in the intended time, and the intended time including the intended date, the intended period and the intended hour is converted through the dialog management system to obtain the target instruction, including the audio signal and the designated task. The target instruction is sent to the client. The client executes the designated task through the execution module, and broadcasts the audio corresponding to the audio signal.

Figure 7:
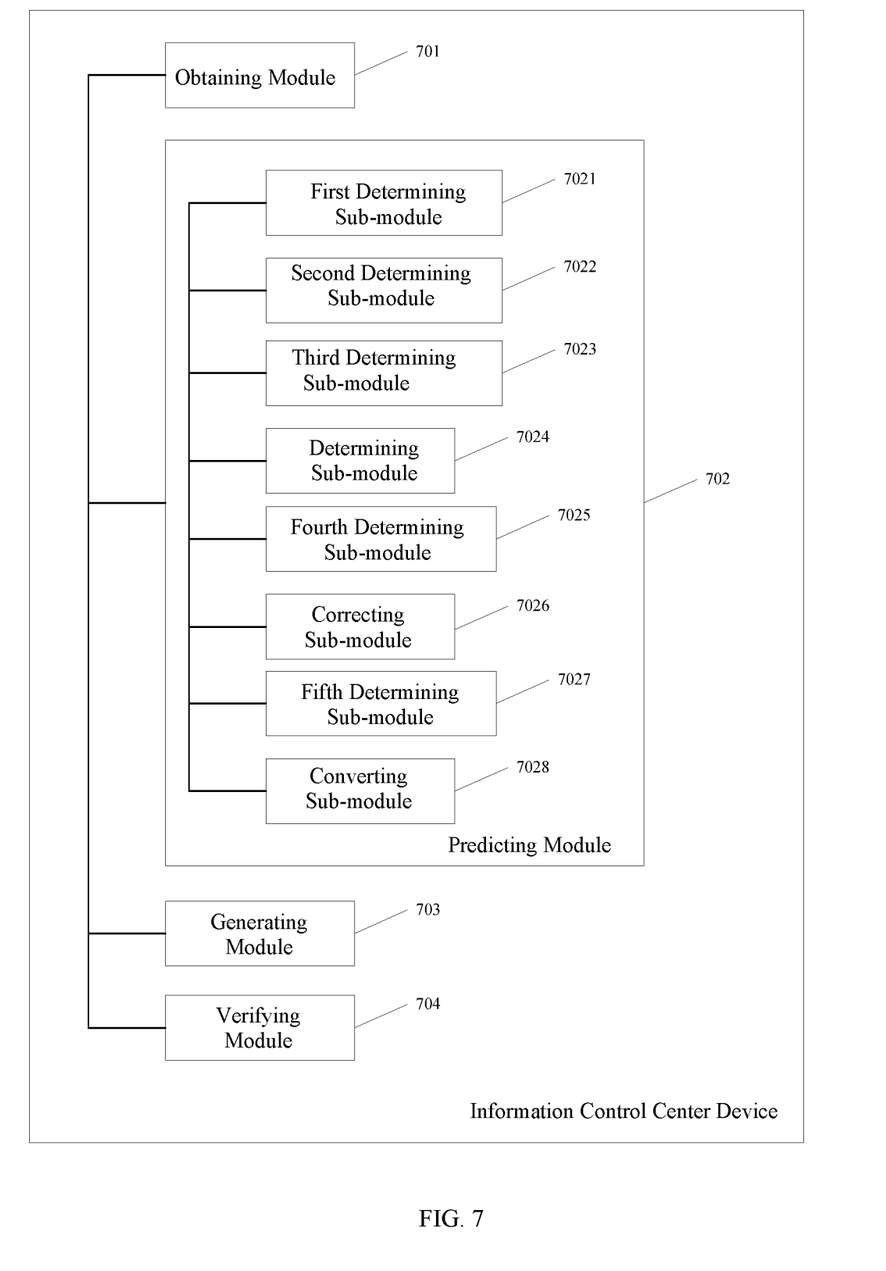
FIG. 7 is a schematic diagram of modules of an information control center device according to an embodiment of the present invention.

FIG. 7 is a schematic diagram of modules of an information control center device according to an embodiment of the present invention.

The information control center device provided by this embodiment comprises: an obtaining module 701 for obtaining semantic parsing information corresponding to a sound signal, the semantic parsing information including a designated time; a predicting module 702 for performing a time prediction on the designated time based on a current time to determine an intended time; and a generating module 703 for generating a target instruction corresponding to the sound signal based on the intended time.

In some embodiments of the present invention, the predicting module 702 includes: a first determining sub-module 7021 for determining whether the designated time includes a designated instant to obtain a first determination result; a second determining sub-module 7022 for determining whether the designated time includes a designated date to obtain a second determination result, when the first determination result is that the designated time includes the designated instant; a third determining sub-module 7023 for determining whether the designated date is later than a current date to obtain a third determination result, when the second determination result is that the designated time includes the designated date; and a determining sub-module 7024 for determining the designated instant and the designated date as the intended time, when the third determination result is that the designated date is later than the current date.

In some embodiments of the present invention, the determining sub-module 7024 is further used to determine the current date as a provisional date, when the second determination result is that the designated time does not include the designated date; the determining sub-module 7024 is further used to determine the provisional date and the designated instant as a provisional time; the predicting module further includes a fourth determining sub-module 7025 for determining whether the provisional time is not earlier than the current time to obtain a fourth determination result; the determining sub-module 7024 is further used to determine the provisional time as the intended time, when the fourth determination result is that the provisional time is not earlier than the current instant.

In some embodiments of the present invention, the predicting module 702 further includes: a correcting sub-module 7026 for correcting the provisional time based on a principle of time proximity to obtain a corrected time, when the fourth determination result is that the provisional time is earlier than a current instant; the determining sub-module 7024 is further used to determine the corrected time as the intended time.

In some embodiments of the present invention, the predicting module 702 further includes: a fifth determining sub-module 7027 for determining whether the designated instant includes a designated period to obtain a fifth determination result; a converting sub-module 7028 for performing a type conversion on the designated instant based on an instant conversion rule to obtain a converted instant, when the fifth determination result is that the designated instant includes the designated period; the converted instant is used to determine the provisional time, the converted instant does not include the designated period, and the converted instant and the designated instant represent a same time.

In some embodiments of the present invention, the obtaining module 701 is further used to obtain the designated time based on the semantic parsing information. The device further includes a verifying module 704 for verifying whether the designated time complies with a temporal regularity to obtain a verification result. When the verification result is that the designated time complies with the temporal regularity, it is determined whether the designated time includes the designated instant.

Another aspect of the present invention provides a computer-readable storage medium comprising a set of computer-executable instructions for performing the information processing method of any one of the above when the instructions are executed.

In this specification, description by reference to the terms "one embodiment", "embodiments", "examples", "specific examples", or "examples", etc. mean that the specific features, structures, materials, or features described in combination with such embodiments or examples are contained in at least one embodiment or example of the invention. Furthermore, the specific features, structures, materials or features described may be combined in an appropriate manner in any one or more embodiments or examples. In addition, technicians in the field may combine and combine the different embodiments or examples described in this specification and the characteristics of the different embodiments or examples provided that no contradictory will occur.

In addition, terms like "first" and "second" are used for illustrative purposes only and shall not be interpreted to indicate or imply relative importance or to indicate implicitly the quantity of indicated technical features. Thus, features that are limited by "first" or "second" may include, explicitly or implicitly, at least one of these features. In the description of the invention, "multiple" means two or more, unless otherwise expressly and specifically qualified.

The above are only specific embodiments of the present invention and do not limit the scope of the present invention. Changes or substitutions that can be easily conceived by those skilled in the art on the basis of the above disclosure should fall within the protection scope of the present invention as defined by the claims.

The invention claimed is:

1. An information processing method for an alarm clock, applied to a cloud server which is connected to the alarm clock in communication, the method comprising:
   receiving a sound signal collected by the alarm clock;
   performing voice recognition and semantic analysis on the sound signal to obtain semantic parsing information corresponding to the sound signal and obtaining a designated time based on the semantic analysis information;
   verifying whether the designated time complies with a temporal regularity to obtain a verification result;
   conducting multiple rounds of dialog interaction using voice synthesis technology to obtain a designated time that complies with the temporal regularity when the verification result indicates that the designated time does not comply with the temporal regularity, wherein the temporal regularity indicates a real-world date and instant;
   performing a time prediction on the designated time based on a current time to determine an intended time;
   generating a target instruction corresponding to the sound signal based on the intended time; and
   sending the target instruction to the alarm clock to cause the alarm clock to execute a corresponding designated task, wherein the designated task is a target intention in the sound signal, and the intended time is an execution time corresponding to the execution of the target intention in the sound signal.

2. The method of claim 1, wherein the performing a time prediction on the designated time based on a current time to determine an intended time comprises:
   determining whether the designated time includes a designated instant to obtain a first determination result;
   determining whether the designated time includes a designated date to obtain a second determination result, when the first determination result is that the designated time includes the designated instant;
   determining whether the designated date is later than a current date to obtain a third determination result, when the second determination result is that the designated time includes the designated date; and
   determining the designated instant and the designated date as the intended time, when the third determination result is that the designated date is later than the current date.

3. The method of claim 2, further comprising:
   determining the current date as a provisional date, when the second determination result is that the designated time does not include the designated date;

determining the provisional date and the designated instant as a provisional time;

determining whether the provisional time is not earlier than the current time to obtain a fourth determination result; and determining the provisional time as the intended time, when the fourth determination result is that the provisional time is not earlier than the current time.

4. The method of claim 3, further comprising:

correcting the provisional time based on a principle of time proximity to obtain a corrected time, when the fourth determination result is that the provisional time is earlier than a current instant; and determining the corrected time as the intended time.

5. The method of claim 4, wherein the principle of time proximity comprises at least one of: a first principle for correcting a provisional instant, a second principle for correcting the provisional date, and a third principle for correcting the provisional date.

6. The method of claim 4, further comprising:

determining whether the designated instant includes a designated period to obtain a fifth determination result; and performing a type conversion on the designated instant based on an instant conversion rule to obtain a converted instant, when the fifth determination result is that the designated instant includes the designated period, the converted instant is used to determine the provisional time, the converted instant does not include the designated period, and the converted instant and the designated instant are used to represent a same time.

7. The method of claim 6, wherein the instant conversion rule comprises at least one of: a first conversion rule for converting an instant type, a second conversion rule for correcting a slip of tongue, and a third conversion rule for processing an instant critical point.

8. The method of claim 2, before determining whether the designated time includes a designated instant, further comprising:

determining whether the designated time includes the designated instant, when the verification result is that the designated time complies with the temporal regularity.

9. A non-transitory computer-readable storage medium comprising a set of computer-executable instructions for performing the information processing method for the alarm clock of claim 1 when the instructions are executed.

10. A cloud server which is connected to an alarm clock in communication, comprising:

an obtaining module for receiving a sound signal collected by the alarm clock, performing voice recognition and semantic analysis on the sound signal to obtain semantic parsing information corresponding to the sound signal, and obtaining a designated time based on the semantic analysis information;

a verifying module for verifying whether the designated time complies with a temporal regularity to obtain a verification result, wherein when the verification result indicates that the designated time does not comply with the temporal regularity, multiple rounds of dialog interaction are conducted using voice synthesis technology to obtain a designated time that complies with the temporal regularity, and wherein the temporal regularity indicates a real-world date and instant;

a predicting module for performing a time prediction on the designated time based on a current time to determine an intended time; and a generating module for generating a target instruction corresponding to the sound signal based on the intended time, wherein the target instruction is sent to the alarm clock to cause the alarm clock to execute a corresponding designated task, the designated task is a target intention in the sound signal, and the intended time is an execution time corresponding to the execution of the target intention in the sound signal.

* * * * *